United States Patent [19]

Bidol

[11] 3,947,155
[45] Mar. 30, 1976

[54] LINEAR COMPRESSOR
[75] Inventor: Michael K. Bidol, Dearborn Heights, Mich.
[73] Assignee: Tecumseh Products Company, Tecumseh, Mich.
[22] Filed: Sept. 19, 1974
[21] Appl. No.: 507,539

[52] U.S. Cl. .................... 417/417; 310/17; 310/27
[51] Int. Cl.² F04B 35/04; H02K 7/14; H02K 33/02
[58] Field of Search ...... 417/417, 418, 416; 310/15, 310/17, 27

[56] References Cited
UNITED STATES PATENTS

| | | | |
|---|---|---|---|
| 1,789,694 | 1/1931 | Beman | 417/416 |
| 1,978,866 | 10/1934 | Konig | 417/417 |
| 1,996,160 | 4/1935 | Konig | 417/416 |
| 2,954,917 | 10/1960 | Bayer | 417/417 |
| 3,312,842 | 4/1967 | Heuchling et al. | 310/17 |
| 3,461,806 | 8/1969 | Barthalon | 417/418 |
| 3,500,079 | 3/1970 | Barthalon | 417/417 X |
| 3,542,495 | 11/1970 | Barthalon | 310/24 X |

FOREIGN PATENTS OR APPLICATIONS 876,849  11/1942  France .................. 417/416

Primary Examiner—C. J. Husar
Assistant Examiner—Leonard Smith
Attorney, Agent, or Firm—Barnes, Kisselle, Raisch & Choate

[57] ABSTRACT

A moving-iron, linear-motor compressor suitable for use in a refrigerant system, wherein a conical armature reciprocates in a complementary air-gap under the influence of an electromagnetic circuit and a pair of linear (constant rate) complementary return springs connected to the armature between the compressor piston and an outboard bearing. The armature rod is made of magnetically permeable material. The electromagnetic circuit includes a pair of abutting convoluted loops of spirally wound magnetic strip material with a conical air-gap fabricated in the area of abutment. The motor has a layered construction which cooperates with the conical armature and air-gap such that the motor is self-aligning at the assembly stage.

29 Claims, 15 Drawing Figures

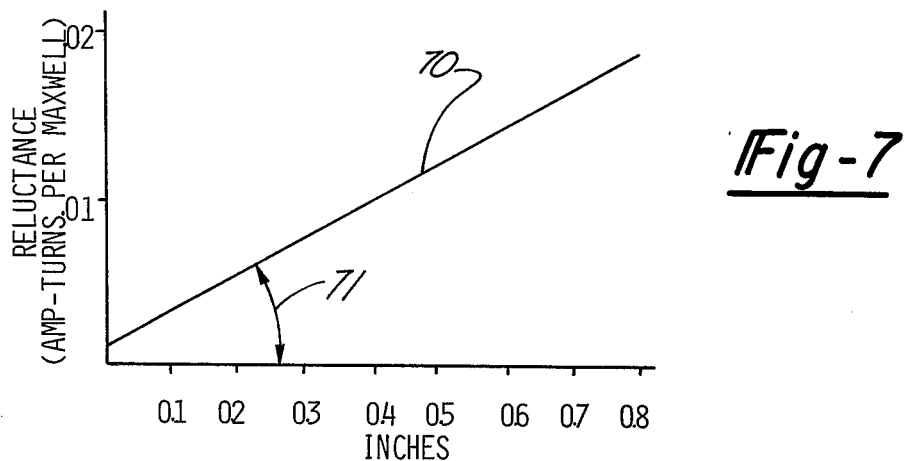
Fig-7
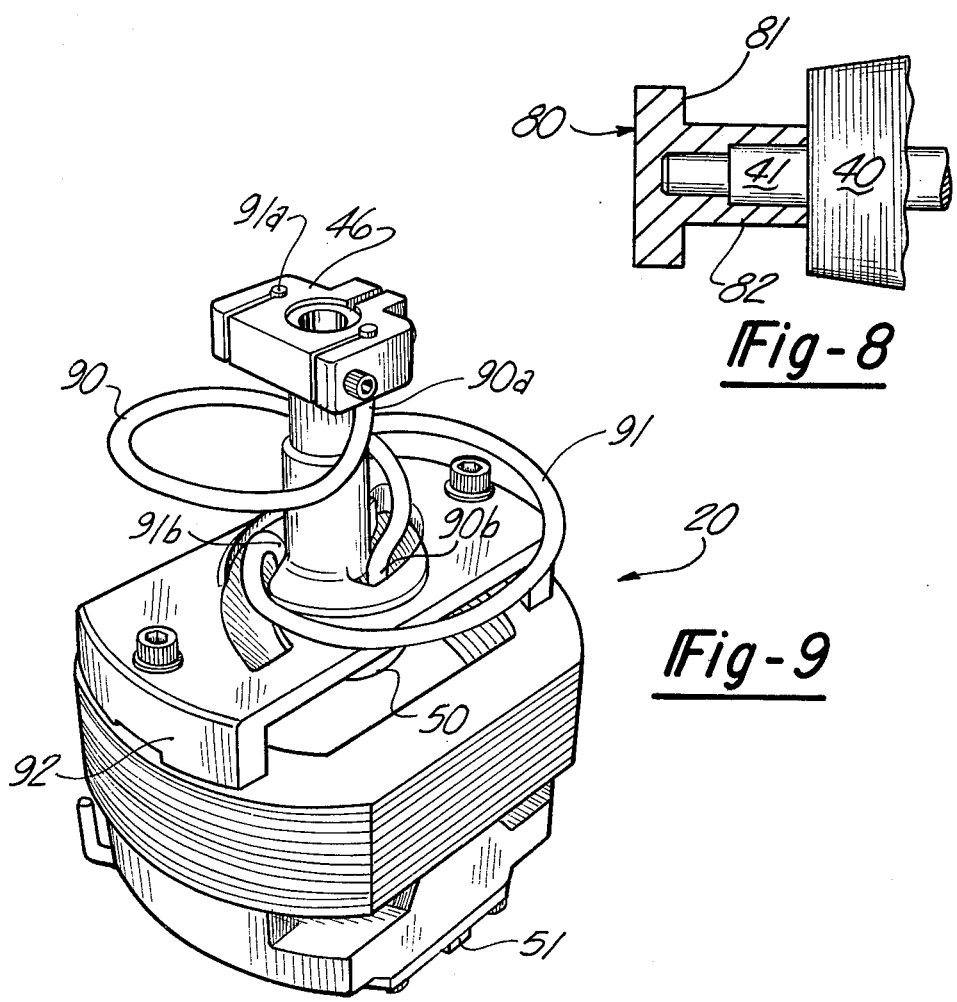
Fig-8
Fig-9

LINEAR COMPRESSOR

This invention relates to reciprocating electric motors of the type in which a magnetically permeable armature is disposed to axially reciprocate within the air-gap of a fixed electromagnetic circuit.

In the art of moving-iron linear-motor compressors, much effort has been expended without having achieved significant commercial success (see P. W. Curwen, "Recent Developments of Oil-Free Linear-Motor Resonant-Piston Compressors,"ASME publication 69-FE-36, June, 1969). The linear-motor compressor disclosed herein has been subjected to extensive laboratory testing and the design parameters have been verified through the use of iterative computer programming techniques, and therefore, the requirements of a commercially viable product are believed to have at last been achieved.

The U.S. Pat. No. 3,461,806 to Barthalon teaches that the efficiency of a linear motor will be optimized if the reluctance of the magnetic circuit varies linearly with armature movement. Pursuant to the present invention, it has been discovered that, in a pump which may act below atmospheric pressure, such as a refrigeration compressor, stability will be enhanced if the reluctance curve has a low slope. It is, therefore, an object of the present invention to provide a moving-iron linear-motor compressor having not only a substantially linear reluctance curve but also one of low slope.

It is another object of the present invention to provide a moving-iron linear-motor compressor that is easy and economical to assemble.

It is a further object of the present invention to provide a moving-iron linear-motor compressor in which radial deflection of the armature rod is reduced or eliminated.

It is yet a further object of the present invention to provide a moving-iron linear-motor compressor in which axial movement of the piston with respect to the armature during operation is prevented.

To achieve a linear reluctance curve of low slope, the present invention provides a moving-iron linear-motor compressor in which the armature and the air-gap defined by the pole pieces of the core of the magnetic circuit have a conical geometry, and preferably the same axial dimension. However, the minimum diameter of the air-gap is greater than the minimum diameter of the armature so that the armature may move through the air-gap a substantial distance beyond the point where these minimum diameters are coplanar. This relationship is coordinated with the electromagnetic drive such that the armature may be flush with the pole pieces at the time of maximum flux through the magnetic circuit to thereby optimize the performance and efficiency of the motor and pump. In addition, the armature rod is made of magnetically permeable material.

The compressor may be easily and quickly assembled in a "layered" fashion, i.e., a sequential part stack-up assembly procedure. An additional feature resulting from this layered construction and from the conical armature geometry is that insertion of the piston, rod and armature into the cylinder block and magnetic circuit, such that the piston is within the compression chamber and the armature is seated against the pole faces, automatically aligns the cylinder block and the magnetic circuit with the piston, rod and armature.

To reduce armature rod deflection, the return means are connected to the armature between the piston and an outboard bearing. To further reduce deflection, the return means includes a pair of complementary return springs with straight end-tangs.

Axial movement of the piston with respect to the armature is prevented by providing a piston element having a positive abutment interconnection with the armature.

The novel features which are considered characteristic of the invention are set forth in particular in the appended claims. The invention itself, however, together with additional objects, features and advantages thereof, will be best understood from the following description when read in connection with the accompanying drawings in which:

FIG. 7 is a graph of the reluctance curve of one embodiment of the compressor of FIG. 1;

FIG. 8 is a sectional view of an alternative piston assembly which may be used in the compressor;

FIG. 9 is a perspective view of an alternative paired spring arrangement which may be used in the compressor;

Figure 1:
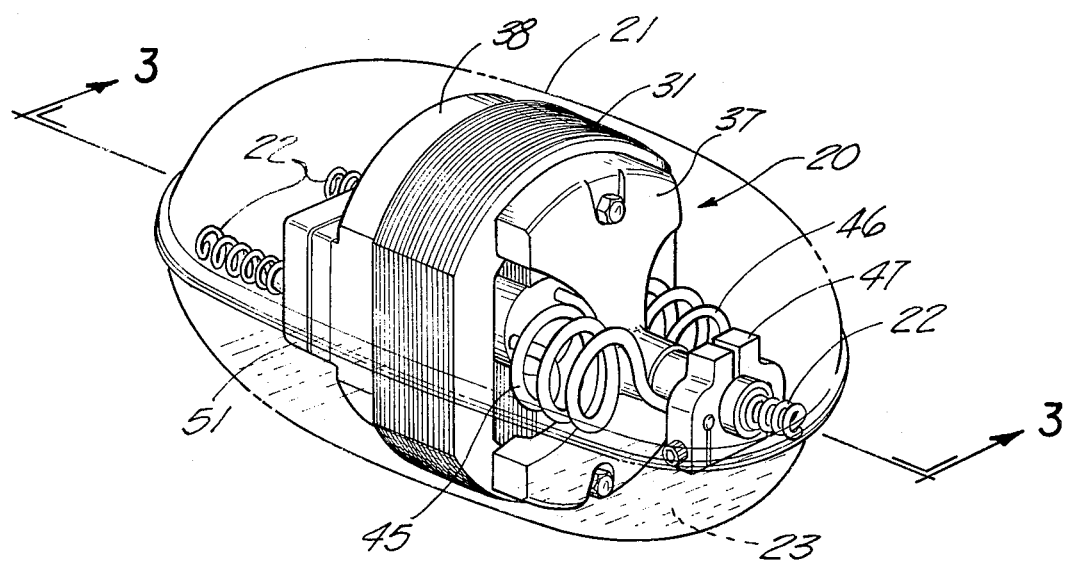
FIG. 1 is a perspective view of one embodiment of the linear-motor compressor hermetically encased within a protective housing in accordance with the present invention.

In the various FIGS., identical reference numerals indicate identical parts. Referring to FIG. 1, there is shown an exemplary embodiment of a linear-motor compressor 20 constructed pursuant to the present invention suspended within a protective enclosure 21 by the suspension springs 22 which ideally provide a zero retarding force to the axial oscillatory movement of compressor 20 and an infinite retarding force to lateral or radial oscillatory movement thereof. Enclosure 21 is hermetically sealed and may be formed of sheet steel or aluminum or molded plastic, and may assume a shape most convenient for the particular application. Lubricating oil is preferably provided in a sump 23 at the bottom of the enclosure at a depth sufficient to contact the lower portion of compressor 20. The oil will be splashed onto the moving parts by the axial reciprocating action of the motor. Alternatively, the oil may be channeled to lubricated surfaces by other means known in the art.

Figure 3:
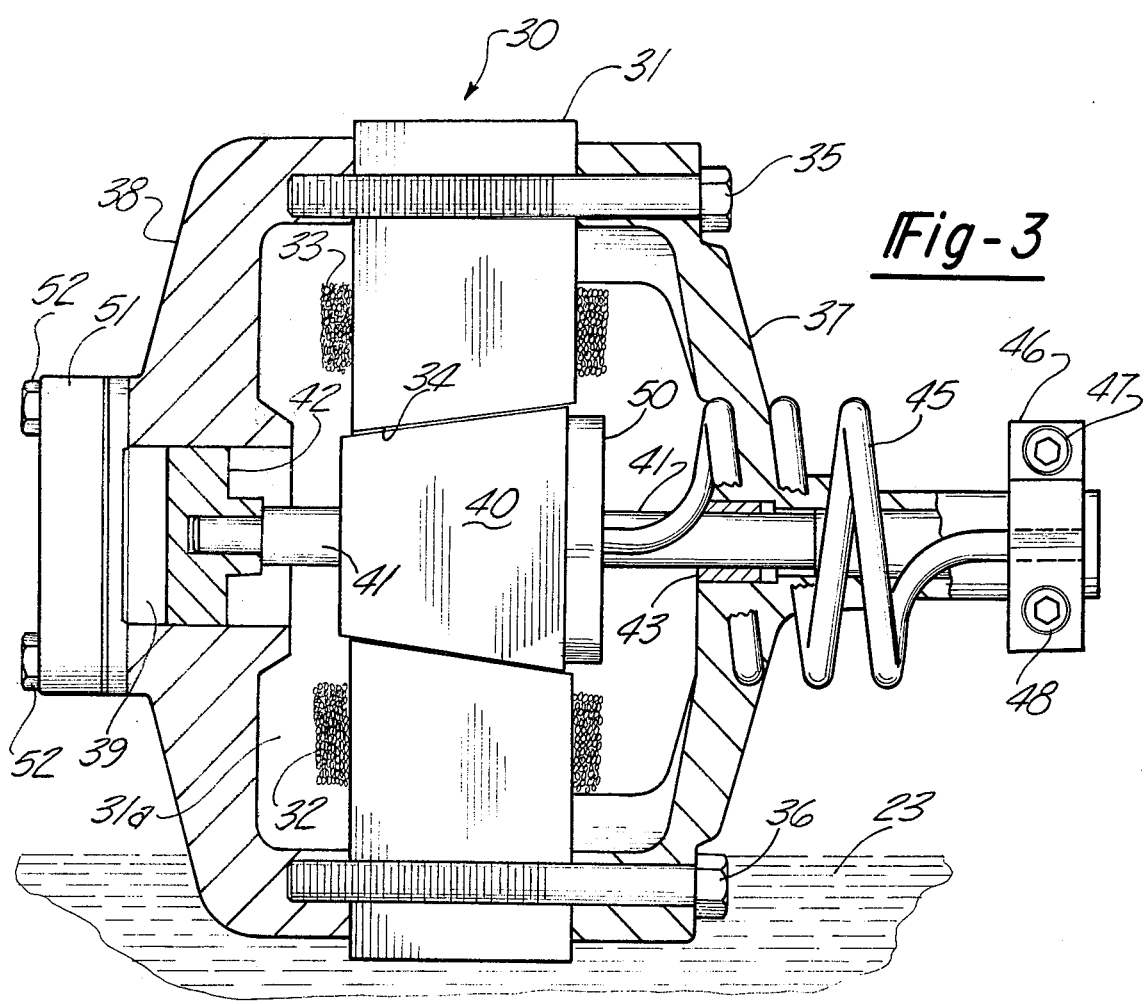
FIG. 3 is an elevational view of the compressor shown in FIG. 1 taken partly in axial section along the line 3—3 of FIG. 1.
Figure 2:
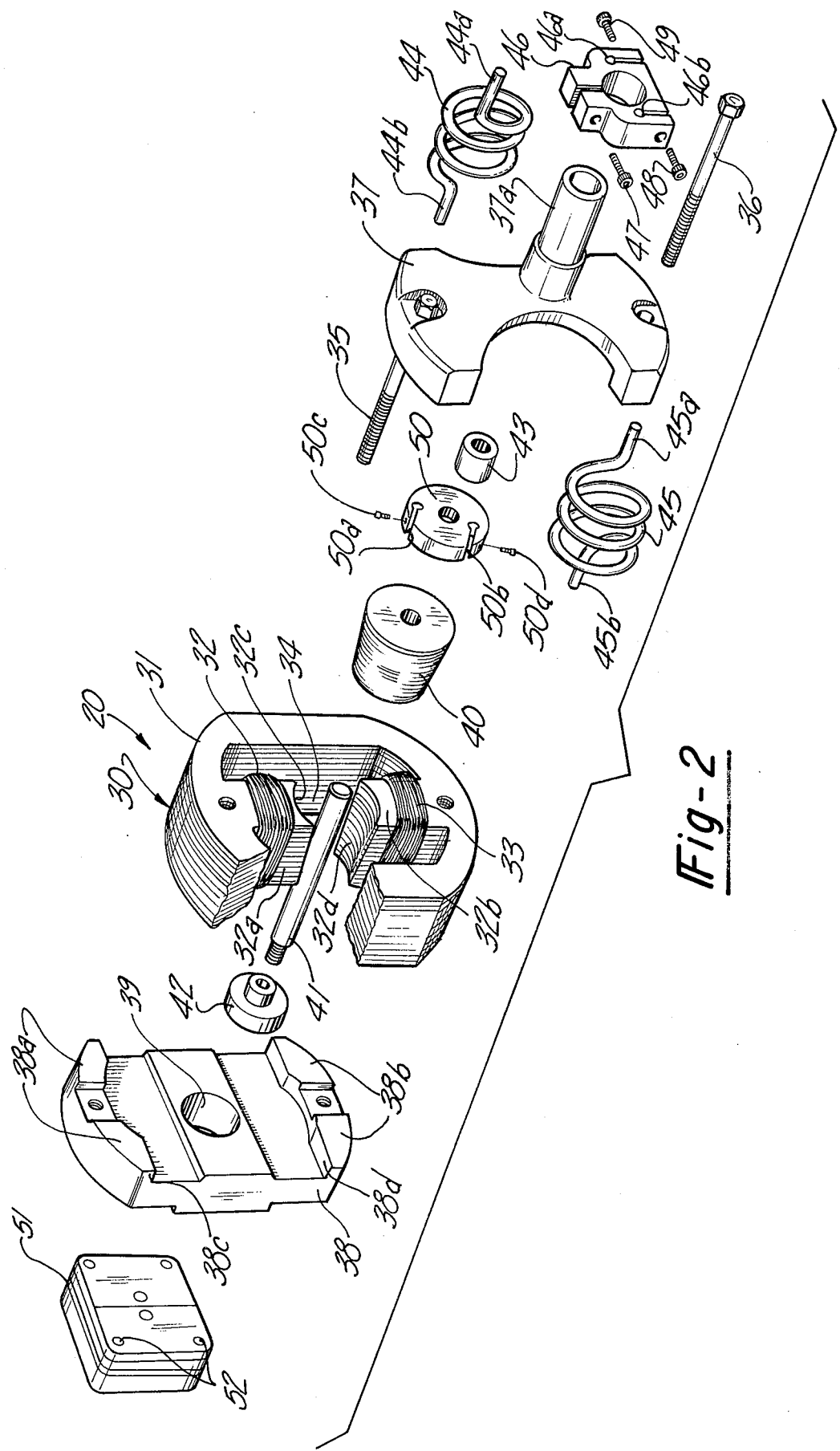
FIG. 2 is an exploded perspective view of the linear compressor motor and gas pump shown in FIG. 1.

The detailed description of compressor 20 may be best understood with reference to FIGS. 2–3. Magnetic circuit 30, which includes magnetic core 31 and windings 32 and 33, has a pair of spaced-apart poles 32a and 32b defining an air-gap 34 with the opposed surfaces or pole faces of poles 32a and 32b defining a portion of a frustoconical surface of revolution. Attached to opposite sides of the magnetic circuit by means of bolts 35 and 36 is an outboard bearing and spring retainer plate 37 and a cylinder block 38 having a pump chamber or cylinder 39 formed therein. As shown in FIG. 3, the taper of air-gap 34 converges in the direction of chamber 39 with the center axis of gap 34 being coaxial with chamber 39.

Movable in air-gap 34 is a frustoconical armature 40 carried by an armature rod 41. Armature 40 may be made of either solid magnetically permeable material or, preferably, stacked laminations as shown. It has been found that the use of stacked laminations increases the efficiency of the compressor by 15 percent. Armature rod 41 may be made of nonmagnetic material, such as stainless steel, or, preferably, magnetically permeable material.

Mounted on one end of rod 41 and slidable in chamber 39 is a piston 42. For maximum compression efficiency, the sliding clearance between piston 42 and the side wall of chamber 39 must be small: a nominal clearance of 0.0003 inches is preferred.

Mounted in plate 37 is a sleeve bearing 43 disposed about rod 41 at the end thereof remote from piston 42. Because of the close sliding clearance between piston 42 and the wall of chamber 39, the piston will cooperate with bearing 43 to maintain rod 41 and armature 40 centered in air-gap 34 during axial displacement of the armature, rod and piston.

Slidably mounted on plate 37 and clamping one end of a pair of return springs 44 and 45 is an adjustable clamp bracket 46. Bracket 46 may be tightly clamped to plate 37 by means of screw 47 which is threadably received in a split or slotted offset portion of the clamp. The respective straight endtang terminations 44a and 45a at the outboard end of springs 44 and 45 are clamped into associated holes 46a and 46b of bracket 46 by means of screws 48 and 49 which traverse associated bracket splits leading to each of the clamp holes. One end of each of return springs 44 and 45 is thus fixedly clamped in relation to magnetic circuit 30 and air-gap 34. The other straight end-tangs 44b and 45b of each return spring 44 and 45 is operatively clamped to armature 40 by means of a spring clamp plate 50 which is mounted on rod 41 against the large diameter face of conical armature 40.

End-tangs 44b and 45b are inserted into associated holes 50a and 50b respectively and clamped therein by means of screws 50c and 50d threadably received into respective split portions of clamp 50. It should be noted that springs 44 and 45 are coiled in the same direction but that each spring enters bracket 46 and clamp 50 from a direction 180° from the direction of entry of the other. In this configuration the bending forces imparted upon armature 40 by the springs during axial reciprocation of the armature tend to cancel each other, thereby assisting bearing 43 and the bearing action of piston 42 to center armature 40 in air-gap 34 during reciprocating axial movement. It should be further noted that endtangs 44a, 44b and 45a, 45b extend in a direction parallel to the central axis of the springs from the periphery of the respective springs. This feature allows bracket 46 and clamp 50 to assume a reduced diameter, thereby reducing the required dimensions of enclosure 21. While several methods of terminating and affixing springs 44 and 45 will be evident to those skilled in the art, it has been found that the use of straight end-tang terminations 44a, 44b and 45a, 45b on the return springs and the associated split clamp mounting facilitates adjustment and assembly.

Compressor 20 is suspended in sump 23 as detailed above with reference to FIG. 1. Because the lateral dimension of block 38, that is, the dimension perpendicular to a line between bolts 35 and 36 and perpendicular to the axis of reciprocation, is less than the corresponding lateral dimension of core 31, which relationship is best seen in FIGS. 1 and 2, and because of the access via side openings provided by the axial spacing of block 38 from core 30 due to mounting pads 38c and 38d (FIG. 2), oil splashed upwardly by the reciprocating action of compressor 20 will enter the chamber 31a (FIG. 3) between core 30 and block 38. Splashed oil which contacts the minor diameter face of armature 34 will be thrust into chamber 39 against the back of piston 42 by the reciprocating action of the armature. This oil will lubricate the sides of chamber 39 in the area of sliding contact with piston 42.

A valve plate and cylinder head assembly 51 is mounted on cylinder block 38 by means of bolts 52. The suction and discharge valves, the valve plate assembly, and the cylinder head may each be any one of the several standard designs known to the art and do not form a part of this invention. In a 450 BTU/Hr working embodiment of the present invention to be discussed in detail hereinafter, valve plate assembly 51 is an adaptation of the valve system from a commercially available Model AE Compressor manufactured by Tecumseh Products Company of Tecumseh, Michigan. Valve assembly 51 will not be discussed further except by reference during the discussion of the assembly and operation of the compressor.

Figure 4:
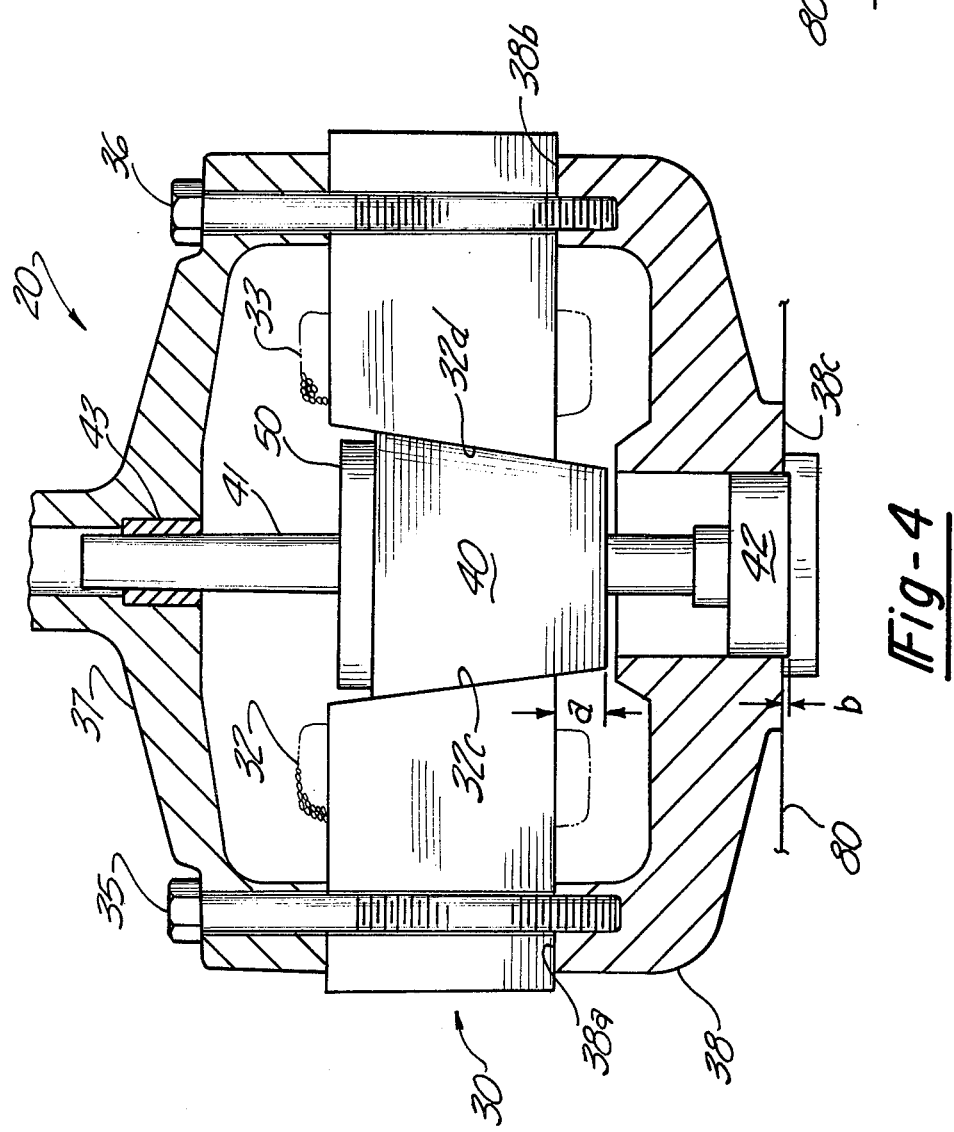
FIG. 4 is an axial sectional view of the compressor shown in FIG. 3 in a stage of partial assembly.

The economical method of assembling the compressor provided by the present invention may be best understood by reference to FIG. 4 in which compressor 20 is shown being assembled on an assembly surface 80. Cylinder block 38 is first placed head-end down on the assembly surface. Then magnetic circuit 30 is loosely placed on the accurately machined seating surfaces 38a and 38b of block 38 with the respective bolt holes of the core and block roughly aligned. The armature rod assembly, consisting of clamp 50, armature 40 and piston 42 all mounted on armature rod 41, is then seated in the magnetic circuit by being piloted piston-end first into chamber 39 until the piston extends sufficiently into chamber 39 such that the conical armature is seated against the pole faces 32c and 32d which define conical airgap 34. Note in FIG. 4 that in this fully inserted condition piston 42 extends beyond the head-end face 38c of cylinder block 38 by an amount of distance indicated "b" when armature 40 abuts the pole faces. The purpose of this extension will be explained in the discussion of the operation of the compressor motor hereinafter. As the armature is being thus seated, the geometry of the armature and air-gap and the tight tolerance between the piston and chamber wall causes the armature rod assembly to act as a set-up jig which cams core 31 sideways so as to shift it laterally on faces 38a and 38b to thereby automatically center the magnetic circuit and cylinder block with one another and with the armature, rod and piston. The outboard bearing plate 37 and bearing 43 is next mounted on the magnetic circuit, and then bolts 35 and 36 are inserted through plate 37 and core 31 and threaded into block 38, thereby automatically aligning bearing 43 with the common axis of the air-gap and compression chamber and bringing the parts into accurated angular registry. Bolts 35 and 36 may be then tightened down to secure the sub-assembly.

Figure 5:
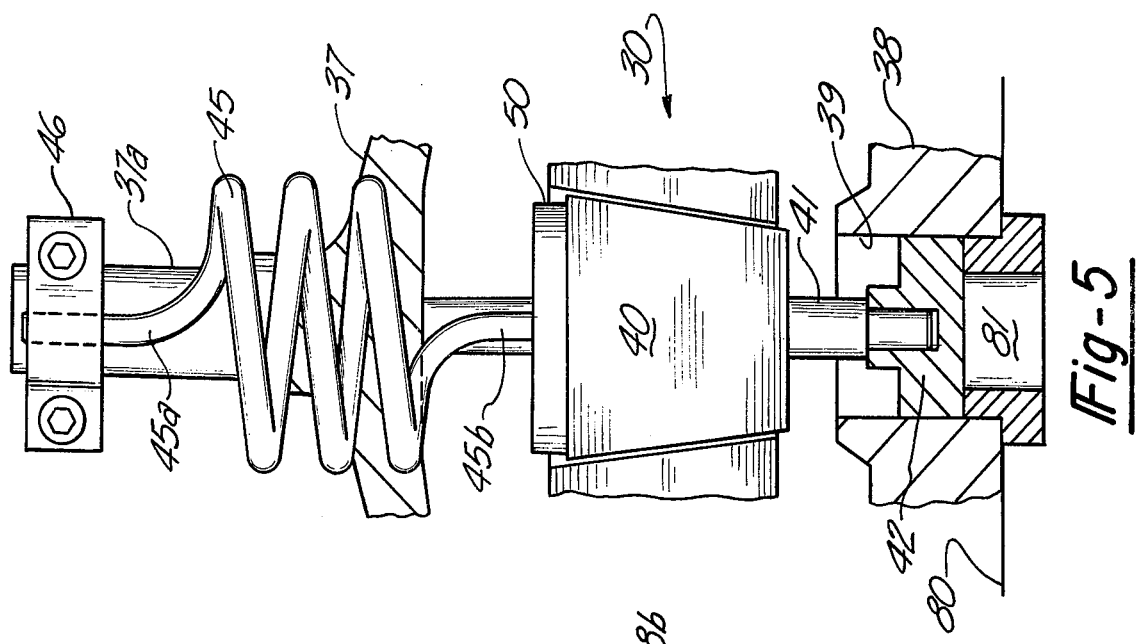
FIG. 5 is a fragmentary axial sectional view of the compressor shown in FIG. 3 in a second stage of partial assembly.

In the next stage of assembly shown in FIG. 5, end-tangs 44a, 44b and 45a, 45b of return springs 44 and 45 are inserted and tightly clamped in adjustable bracket 46 and clamp 50. Bracket 46 at this stage is loosely received on a mounting post 37a of plate 37 so that it can move thereon as piston 42 is raised to rest upon a jig block 81 which is inserted below the piston in the pocket of the assembly surface 80. The piston and armature will then be in the desired rest position, and clamp 46 is then tightly clamped to post 37a after the valve plate and cylinder head assemblies 51 are mounted to the cylinder block, the motor will be ready for operation.

To operate the linear compressor motor, windings 32 and 33 must be connected to a source of alternating current. In the embodiment of the invention illustrated herein, the source of alternating current is half-wave rectified utility power at a frequency of 60 Hz. The motor thus operates at 3600 reciprocations per minute. It is well known in the art that maximum compressor efficiency will be achieved when the resonant frequency of the compressor during normal operation approaches the line frequency of the exciting voltage. Thus, the natural oscillating frequency of the piston, armature, rod and return springs taken together with the normal suction and discharge pressures in the compression chamber should approach 60 Hz. The natural frequency of the return springs together with the rod, piston and armature must, therefore, be less than the frequency of exciting current. In the disclosed embodiment, the natural frequency of the return springs and the rod, piston and armature is preferably substantially equal to 38 Hz.

Figure 6:
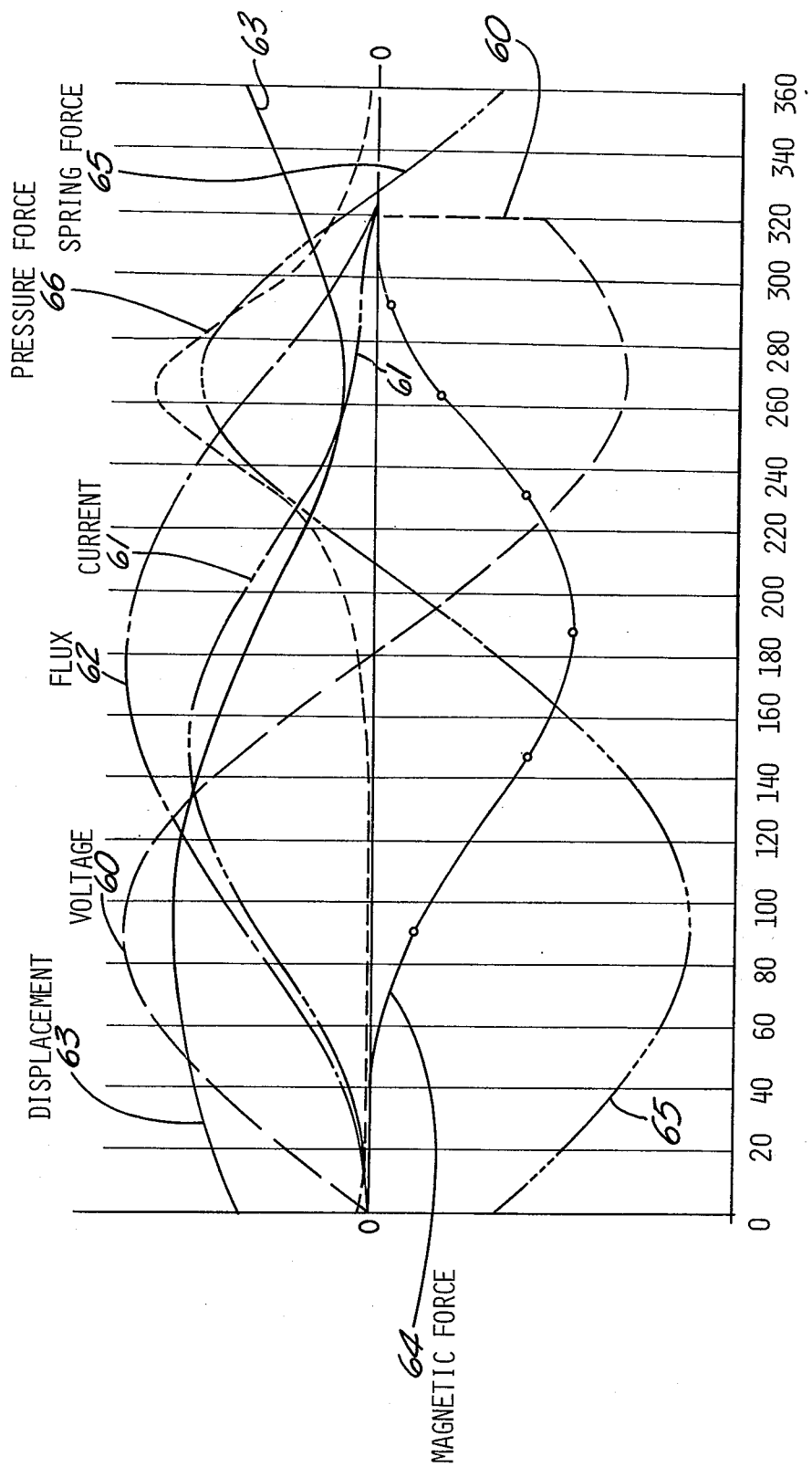
FIG. 6 is a graph used to explain the operation of the compressor shown in FIGS. 1–5.

Operation of compressor 20 may be best understood with reference to FIG. 6 which is a timing diagram depicting the relationships of selected parameters of compressor 20 during one cycle of line voltage. The line voltage 60 describes a substantially sinusoidal pattern over the duration of a 360° cycle time. Because compressor 20 presents an inductive load to line voltage 60, it is to be expected that the current 61 will lag voltage 60 and describe a rectified half wave which is periodic but not sinusoidal. The flux 62 through magnetic circuit 30 follows, but slightly lags, current 61. The ordinates of voltage 60, current 61 and flux 62 are measured in units of volts, amps and kilomaxwells respectively and are not to scale. However, voltage 60, current 61 and flux 62 have a common zero ordinate reference for clarity of understanding. The armature displacement 63 is measured in units of inches with the zero displacement reference being the abutment position of armature 40 against pole faces 32c and 32d which reference position is depicted in FIG. 4. The magnetic force 64 is measured in units of pounds with reference to positive displacement of armature 40. Thus, magnetic force 64 which tends to move armature 40 in a negative direction, that is, a direction toward the zero displacement reference, is shown executing a negative excursion from the zero magnetic reference point. Similarly, spring force 65, which is the force exerted upon armature 40 by springs 44 and 45, and pressure force 66, which is the force exerted on the compression face of piston 42, are measured in units of pounds with reference to a positive axial displacement armature 40; that is, a spring or pressure force which tends to move armature 40 in the direction of positive axial displacement is considered to be a positive force. Magnetic force 64, spring force 65 and pressure force 66 have a common zero ordinate reference for clarity of understanding. The abscissa of FIG. 6 is measured in units of electrical time in degrees of a single cycle of line voltage 60. It should be noted with respect to FIG. 6 that, while the signals shown therein are not to scale, the geometry of each signal is duplicated from test results based upon the 450 BTU/Hr working embodiment to be set forth in detail hereinafter.

In the operation of compressor 20 voltage 60 begins a positive excursion at electrical time zero degrees and induces current 61 in the windings of magnetic circuit 30. Current 61 induces, in turn, flux 62 in core 31 and armature 40. Thus, starting at zero degrees electrical time, magnetic force 64 gradually increases (in the negative direction) and urges armature 40, and therefore piston 42, in the negative displacement direction. It will be noted from FIG. 6 that, at time zero degrees, armature 40 is moving in the positive displacement direction which means that, at the beginning of an electrical cycle, the armature is executing its return stroke, as opposed to its compression stroke, as a result of the momentum imparted to the moving assembly comprising armature 40, rod 41, piston 42 and clamp 50 by return springs 44 and 45 during the preceding electrical cycle. Spring force 65 is negative at time zero degrees indicating that springs 44 and 45 are in compression and exert a force on armature 40 in the negative displacement direction. Thus, shortly after time zero degrees, magnetic force 64 cooperates with spring force 65 to work against the momentum of the assembly to arrest positive displacement thereof and begin movement in the negative direction.

At an electrical time of 90°, displacement 63 has reached its maximum value and the moving assembly has reached its "top dead point" of operation. The assembly will begin to move in the negative direction. As is to be expected, at time 90 degrees spring force 65 has reached its maximum negative or compression value and will begin to move in the positive direction. Magnetic force 64 will continue to increase in a negative direction as current 61 and resulting flux 62 increase. Armature 40 and piston 42 now move in the negative displacement or working direction toward the head-end of pump chamber 39, compressing the gas in chamber 39 to a desired discharge pressure at which the discharge valve will open.

When moving in the negative displacement direction, armature 40 will eventually pass its neutral position so hat springs 44 and 45 go into tension and begin to retard further negative displacement of the moving assembly. In FIG. 6 this neutral or zero spring force position is achieved at an electrical time of approximately 208°. It should be noted that at time 208° flux 62 has already passed its maximum point and has begun to decline toward zero.

When magnetic force 64 and the rate of change of momentum of the moving mass 40, that 42 and 50 is equal to the sum of spring force 65 exerted on armature 40 by return springs 44 and 45 in tension and pressure force 66 exerted on the face of piston 42 by the compressed gas in chamber 39, positive displacement is arrested and the armature and piston reach their "bottom dead point" of operation. In FIG. 6 this occurs at an electrical time of approximately 265°. It should be noted that at this "bottom dead point" time flux 62 in magnetic circuit 30 is less than half of its maximum value.

Magnetic force 64 will continue to decline after bottom dead point time 265° so that spring force 65 and pressure force 66 govern movement of the armature and piston and return the moving assembly in the positive displacement or return direction. Winding current 61 reaches a zero value at time 320°. Because the current is rectified, voltage 60 drops to zero at this time. The moving assembly comprising armature 40, rod 41, piston 42 and clamp 50 continue motion in the positive displacement or return direction under the influence of pressure force 66 and spring force 65. Positive displacement 63 will continue to increase until the moving assembly reaches its top dead point of operation under the influence of the spring and magnetic forces as outlined above.

In prior linear-motor compressors of the type which include a cylindrical armature and air-gap, the armature is attracted into the air-gap and made to do work until it reaches a point at which its top and bottom end faces are flush with the faces defining the axially opposite ends of the air-gap. At this point, the armature completely fills the air-gap and, since the air space between the armature and pole faces is constant, the reluctance of the total magnetic circuit is at a minimum. The armature can thus be made to do no further work in that cycle. It has apparently been assumed by others in the art that this constraint will also apply to a linear motor having a conical armature and air-gap; this, however, is not the case.

Indeed, pursuant to the present invention, it has been discovered that maximum compressor efficiency is obtained when the conical armature "fills the air-gap" at the point of maximum flux and that, since this maximum flux point will not necessarily occur at the "bottom dead point" of operation, it is advantageous to have the armature continue through the air-gap beyond this flush point. Since the air space between the armature and pole faces is no longer constant and is, in fact, a function of axial displacement, the reluctance of the total magnetic circuit will continue to decrease even though part of the armature is moving out of the air-gap.

Returning to FIG. 4, it can be seen that armature 40 extends out of the air-gap a distance "a" when piston 42 extends a distance "b" beyond the end face of cylinder block 38. The flush condition will exist when the minimum diameters of the armature and air-gap are coplanar—i.e., when $a = 0$. It is undesirable to allow armature 40 to strike the pole faces; for this reason, distance "a" is made much larger than distance "b". The piston will thus strike the valve plate before the armature can reach the pole faces, which prevents the armature from striking the pole faces.

Referring to FIG. 6, it will be seen that the "bottom dead point" of opeation is achieved at an electrical time of about 265°. At this time flux 62 in magnetic circuit 30 is less than half of its maximum value. Armature 40 is to be positioned on rod 41 so that the armature is flush with pole pieces 32a and 32b at an electrical time of approximately 180°, at which time flux 62 achieves its maximum value. This may be accomplished by modifying the diameter of air-gap 34 vis-a-vis the diameter of armature 40, while maintaining identical included angles of taper, so that, when piston 42 is in the set-up position shown in FIG. 4, armature 40 extends through the air-gap a distance calculated to achieve the desired flush position at the desired time based upon the test results shown in FIG. 6. Referring again to FIG. 4, in the 450 BTU/Hr working embodiment of the invention armature 40 is positioned to extend approximately 0.350 inches beyond pole pieces when piston 42 extends 0.030 inches beyond the headend of cylinder block 38.

The minimum air space between the pole faces and the armature will exist when the piston abuts the valve plate assembly. In the disclosed embodiment this minimum space, that is, the minimum distance from a pole face perpendicular the armature as measured in a direction peerpendicular to the pole face, is substantially 0.0035 inches. It would, of course, be undesirable to allow the piston to continually strike the valve plate during normal operation. However, as is well known in the art, compression efficiency is optimized when the distance between the piston face and the valve plate approaches zero at the "bottom dead point" of operation. Magnetic force, spring force and compression force must be thus optimized to achieve maximum compression efficiency without allowing the piston to strike the valve plate.

While it has been stated for purposes of explaining the operation of the invention that the armature moves "into" and "out of" the air-gap, it should be noted that the present invention, utilizing the discovery outlined above, need not move the armature "entirely out of the air-gap" nor locate "a major portion thereof" outside of the air-gap at the "top dead point" of operation, contrary to the disclosure in the U.S. Pat. Nos. 3,542,495 and 3,461,806 to Barthalon respectively. Indeed, in the embodiment disclosed herein, which operates at 450 BTU/Hr at standard rating point conditions, the total compression stroke is only 0.8 inches, and the armature exposure at the "top dead point" of operation is less than 50 percent.

When the magnetic circuit reluctance characteristics detailed above have been defined — i.e., a substantially linear reluctance curve over the entire stroke length and an armature flush condition at the time of maximum flux — then the included angle of taper of armature 40 and air-gap 34 may be specified. As stated above, it has been found that, under the above recited conditions, a piston extension dimension "b" of 0.030 inches yields good results. To achieve this dimension, the included angle of taper of the armature and air-gap should be at least 10°, and a range of taper included angles between 10° and 14° is preferred.

The aforementioned Barthalon patent teaches that the efficiency of a linear motor will be optimized if the reluctance of the magnetic circuit varies linearly with armature movement. Pursuant to the present invention, it has beer discovered that the stability of a pump which may occasionally operate below atmospheric pressure, such as a refrigeration compressor, will be enhanced if the linear reluctance curve also has a low slope. The various design parameters have been optimized in the present compressor motor to achieve this desired result. While it is not necessary to have the angle of taper of the armature identical to that of the air-gap, it has been found that this condition gives the best overall results. It has also been found that the best results are achieved if the net cross section of the armature, that is, the cross sectional area of the armature taken on a plane through the center of the armature parallel to the axis of movement and excluding the armature rod, is equal to about 80 percent of the effective cross sectional area of the pole piece. The effective cross sectional area of the pole piece is that area taken on a plane parallel to the axis of movement of the armature and perpendicular to the flux through the pole piece and should be substantially square rather than rectangular to achieve the minimum winding length per unit of desired flux. The gross cross sectional area of the armature, that is, the cross sectional area of the armature taken as above but including the armature rod, should be greater than the effective cross sectional area of the pole piece. This arrangement yields good results, particularly when an armature rod of magnetically permeable material is used to increase the "magnetic cross section" of the armature.

The reluctance curve of the above-mentioned 450 BTU/Hr embodiment is shown in FIG. 7. In the curve 70 of FIG. 7 the abscissa is in inches of displacement as measured from the condition of FIG. 4 when the armature is seated in the magnetic core. The ordinate measurement of reluctance indicates that minimum reluctance at the position of FIG. 4 is approximately 0.001 ampere-turns per maxwell. It has been found that an excessive slope angle 71 is accompanied by frequent impact of piston 42 upon valve plate 51, while an insufficient slope results in loss of mechanical efficiency and a reduced range of conditions for successful operation. It will be noted that reluctance curve 70 is substantially linear over the entire stroke of 0.8 inches and has a slope of approximately 0.022 ampere-turns per maxwell-inch. the parameters of this 450 BTU/Hr working embodiment which contribute to this low-sloped, linear reluctance curve, and the consequent high compressor efficiency, are set forth in the discussion of the working embodiment detailed hereinafter.

As stated above, the compression volume between the piston face and valve plate assembly should approach zero at the "bottom dead point" of operation. Since the motor does not contain means to positively stop movement of the piston in the direction of compression, it may be expected that the piston will occasionally strike the face of the valve plate assembly, thus tending to jerk armature 40 along the rod 41 in the direction of the compression chamber. If the armature is allowed to move in response to this jerking action, it may be expected that the armature will eventually strike the face of the pole pieces, thus damaging the core and armature and causing loud acoustical noise as well as detuning the mechanism. It is, therefore, desirable to inhibit movement of the armature with respect to the piston. Means for accomplishing such a purpose is shown in FIG. 8. Piston 80 contains head portion 81 and shank portion 82 extending along rod 41 into abutment with armature 40. With piston 80 secured to rod 41, as by press fit, shrink fit, adhesive and/or being made integral, and also abutting armature 40, movement of the armature with respect to the piston in response to the jerking action above mentioned is prevented.

FIG. 9 shows an alternative to the three-turn paired spring arrangement in compressor 20 of FIG. 1. A pair of single-turn linear springs 90 and 91 extend between bracket 46 and clamp 50 through a slotted outboard bearing and spring retainer plate 92. Springs 90 and 91 are clamped at tangs 90a, 91a and 90b, 91b to bracket 46 and clamp 50 respectively. Plate 92 is slotted where springs 90 and 91 pass therethrough so that movement of armature 40 toward valve plate 51, which movement results in a linear extension of the single coil of springs 90 and 91, will not cause interference between the springs and plate 92. The use of single-turn springs 90 and 91 reduces the overall axial dimension of motor 20 and also reduces the twisting forces imparted upon armature 40 by the springs during axial reciprocation of the armature.

A second alternative to the three-turn paired spring arrangement in the compressor of FIG. 1 is shown in which 10 and 11. An outboard bearing and spring retainer plate 100 is clamped to magnetic circuit 30 and cylinder block 38 by the tie bolts 102 and 104. Plate 100 has a pair of spring retainers 106 and 108 each of which fixedly clamps one end of the zero pitch linear springs 110 and 112. Respective straight end-tang terminations 110a and 112a at the outboard end of springs 110 and 112 are clamped into associated holes 106a and 108a of clamps 106 and 108 by means of screws 114 and 116 whhich traverse associated bracket splits leading to each of the clamp holes. End-tangs 110b and 112b are similarly clamped to armature 40 by means of spring clamp plate 50.

It will be appreciated by those skilled in the art that, depending upon the manufacturing technique used to fabricate the springs, a "zero pitch" spring will have a pitch between zero and the diameter of the spring material. Where straight end-tangs are required, the spring is usually first coiled on a circular mandrel or jig with the end-tangs extending tangentially from the coil. The end-tangs are then bent to positions perpendicular from the plane of the coil. The pitch of the spring thus formed will be substantially equal to zero within some tolerance range which depends upon the resilience of the material used to wind the spring.

There are approximately 0.92 turns of spring material in springs 110 and 112. End-tangs 110a and 110b of spring 110 are thus laterally spaced from each other allowing room for spring 112 to pass therethrough before terminating in clamp 50. Similarly, end-tangs 112a and 112b are spaced to allow passage of spring 110 therebetween, thereby internesting the springs. In this geometry the coils of springs 110 and 112 are aligned with a line connecting tie bolts 102 and 104 rather than being perpendicular therewith and are contained within the lateral perimeter of compressor 20 defined by magnetic circuit 30, thereby reducing the lateral and axial dimensions of the compressor. Furthermore, with the coils of springs 110 and 112 disposed in axial proximity to magnetic circuit 30, housing 21 which encompasses compressor 20 may assume an eliptical shape which is believed to reduce the level of acoustical noise eminating from an operating unit.

Figure 10:
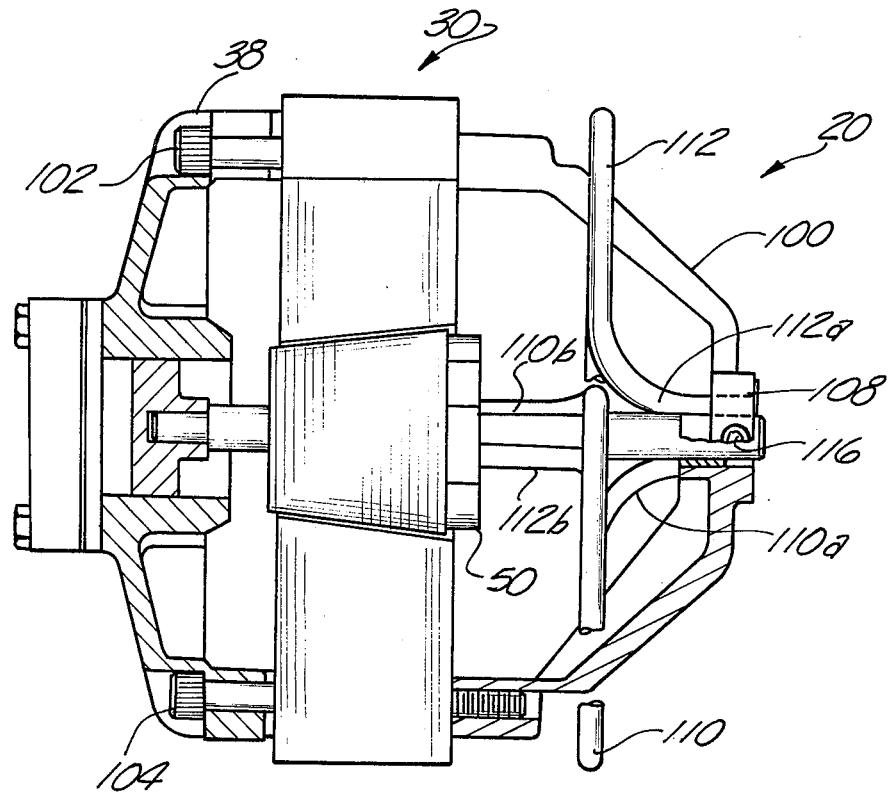
FIG. 10 is a fragmentary axial sectional view of an alternative embodiment of the compressor of FIG. 1 which includes a pair of zero-pitch internesting springs.
Figure 11:
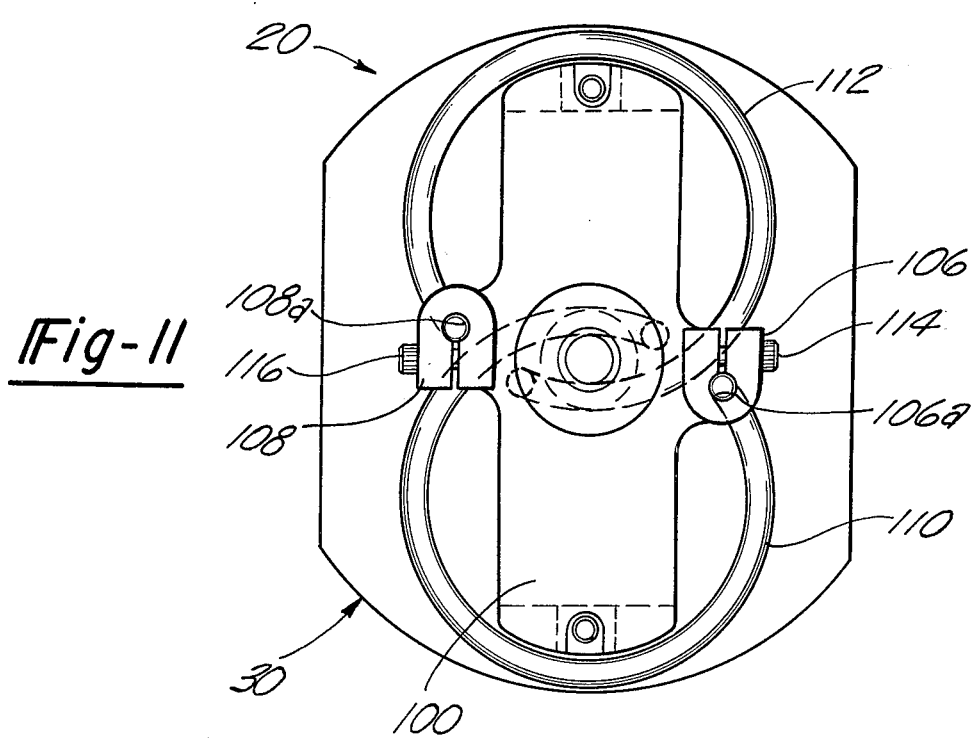
FIG. 11 is an end view of the compressor of FIG. 10 which shows the internested relationship of the springs in greater detail.

The zero pitch internesting springs shown in FIGS. 10 and 11 have the additional advantage of reducing the twisting forces imparted upon armature 40 almost to zero. This reduction in the torsion or twisting forces on the armature and springs results in long spring life and helps maintain armature 40 within air-gap 34 during axial reciprocation thereof.

Figure 12:
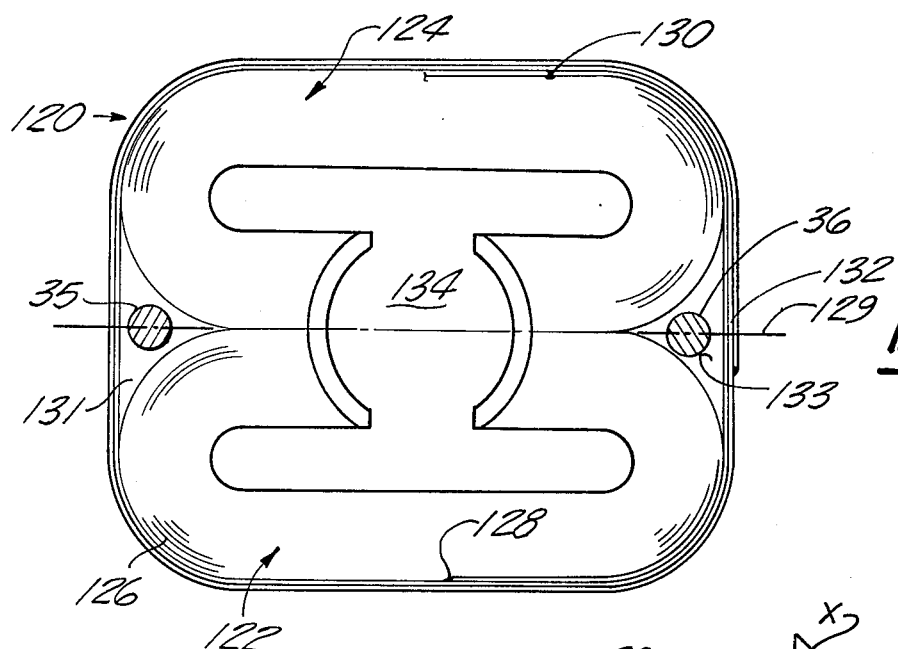
FIG. 12 is a plan view of a modified magnetic core which may be used in the compressor of FIG. 1.

As shown in FIG. 2, magnetic core 31 comprises stacked laminations attached in a manner well known in the art. Alternatively, the magnetic core may be comprised of first and second inner loops spirally wound of magnetic strip material with the loops placed in abutment and banded together by an outer loop of the same magnetic strip material. Such a core 120 is shown in FIG. 12 and is constructed by first separately winding a pair of identical inner loops 122 and 124 of magnetic strip material to form spiral wrap pattern 126. When loop 122 has reached the desired thickness, the strip material may be terminated and tacked as shown in 128. When loop 124 has reached the desired thickness, the strip material is to be tacked as at 130, but need not be terminated. Loops 122 and 124 are than placed in flat end abutment on plane 129 and the magnetic strip material extending from tack 130, or a separate strip material tacked onto either loop at a convenient attachment point, is wound around the exposed periphery of the dual loop subassembly to form an outer convoluted loop 132 which holds inner loops 122 and 124 tightly together as disclosed in U.S. Pat. No. 2,431,128. Conical air-gap 134 is then machined in the area of abutment of inner loops 122 and 124. Windings 32 and 33 will be wound about the opposing pole pieces and will have magnetic communication carried entirely by the inner loops. For this reason, outer loop 132 may be of any convenient material. The magnetic core shown in FIG. 12 is more easily assembled and has less waste material than stacked lamination core 33.

Figure 13:
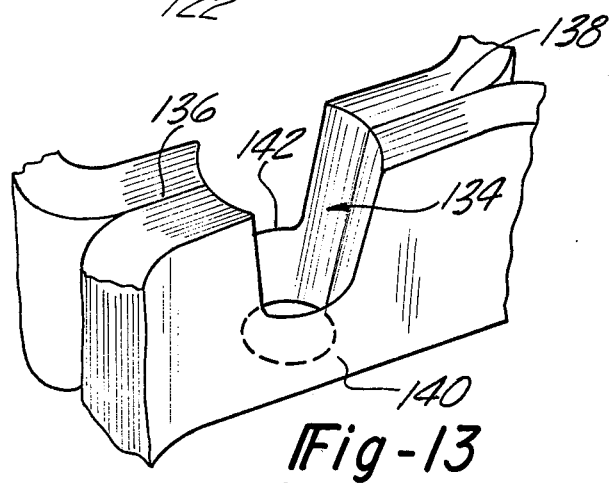
FIG. 13 is a perspective view of the air-gap in the core of FIG. 12 at an intermediate stage of fabrication.

FIG. 13 is a perspective view of conical air-gap 134 after the air-gap is first machined into the area of abutment of first and second loops 122 and 124. When the minor diameter of gap 134 is less than the width of the core (i.e., the dimension perpendicular to plane 129), then the pole pieces 136 and 138, rather than being isolated from each other, are connected by the magnetic bridges or connections 140 and 142 on either side of the machined gap. In order to mount windings 32 and 33 upon pole pieces 136 and 138, connections 140 and 142 must be removed at a second machining stage in the fabrication of magnetic core 120.

Figure 14:
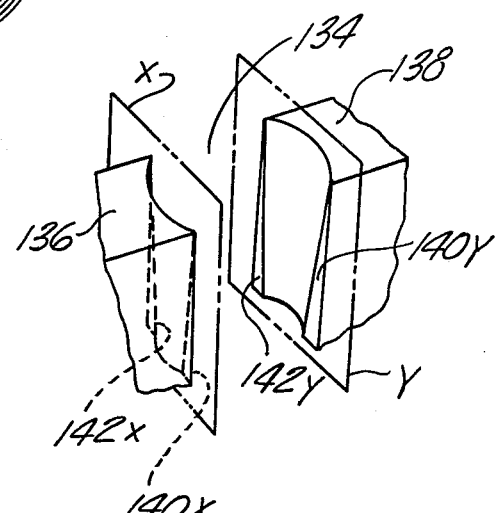
FIG. 14 is a perspective view of the completed air-gap in the core of FIG. 12.

FIG. 14 is a perspective view of air-gap 134 in magnetic core 120 after bridges 140 and 142 have been removed. Bridges 140 and 142 have been removed by machining across the faces of pole pieces 136 and 138 in a pair of planes X and Y respectively perpendicular to the central axis of poles 136 and 138 and parallel to but displaced on opposite sides of the axis of reciprocation. When the distance between planes X and Y is less than the maximum diameter of gap 134, this machining will produce inthese planes the triangular coplanar exposed gap surfaces 140x, 142x, and 140y, 142y upon opposing faces of pole pieces 136 and 138 respectively. When the gap between planes X and Y is to be only sufficient to allow insertion of windings 32 and 33, a distance between the planes of 16.7 percent of the cross-sectional area of the poles is sufficient.

Figure 15:
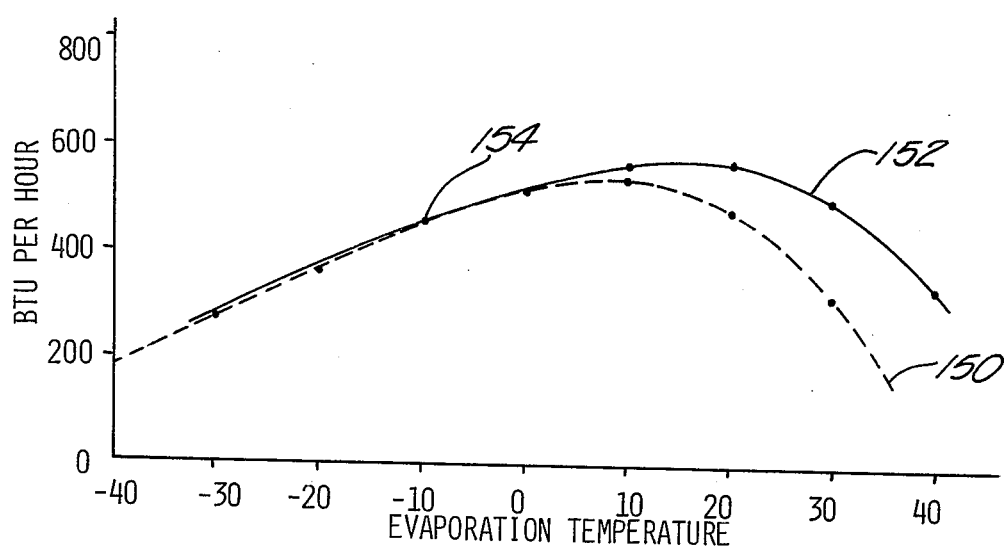
FIG. 15 is a graph used to explain the operation of the modified core shown in FIG. 12.

However, it has been discovered pursuant to the present invention that compressor operation is enhanced when the distance between planes X and Y is increased beyond this 16.7 percent figure. In a specific 450 BTU/Hr working embodiment of the present invention having 1.5 inch-square poles, the distance between planes X and Y was increased to 0.8 inches or approximately 35.5 percent of the cross-sectional area of the poles. This arrangement yielded the results shown in FIG. 15 when compared to a similar 450 BTU/Hr unit with a planar gap of 0.375 inches or 16.7 percent. In FIG. 15 BTU/Hr output is plotted versus evaporation temperature. Dashed curve 150 depicts the output of the 0.375 inch unit over a wide range of evaporation temperatures while curve 152 represents the output of the 0.8 inch unit over the same range. It can be seen that the two units perform equally at rating point conditions – point 154 — and perform similarly at evaporation temperatures lower than rating point. However, at higher evaporation temperatures the performance of the 0.375 inch unit falls off much more rapidly than the performance of the 0.8 inch unit. It should be noted that the curves of FIG. 15 were plotted from actual test results and are to scale.

Strip wound core 120 may replace laminated core 31 in compressor 20 of FIG. 2. In this compressor assembly, tie bolts 35 and 36 pass through a pair of substantially triangular apertures 131 and 133 which are formed in the area of abutment of inner loops 122 and 124 and are bounded by the inner loops and outer loop 132 as best seen in FIG. 12. Apertures 131 and 133 afford core 120 a greater degree of lateral "slop" in the assembly stage, thus facilitating the automatic alignment process discussed above with respect to FIG. 4. In addition, the strip wound core is not compressible in the direction of tightening of tie bolts 35 and 36. For this reason, it is easier to hold alignment tolerances when core 120 is used.

The material disclosed immediately above with reference to FIGS. 10–12 is the subject of a separate U.S. Pat. application of Richard A. Stuber Ser. No. 507,538 having the same filing date as the subject application and assigned to the assignee of this application. The general concept of tailoring the pole pieces 136, 138 such as along planes X and Y as shown in FIG. 14 and its effect on performance is part of the present invention. The specific air-gap sequentially fabricated as shown in FIGS. 13 and 14 and as described above in connection with the specific ratios of plane spacing to pole cross section to achieve the result graphically depicted in FIG. 15 is, however, the subject of the above-mentioned application of Richard A. Stuber. These concepts are disclosed herein as being part of the best method presently known for practicing the subject invention.

Pursuant to the present invention, several working embodiments of compressor 20 have been built and tested; one such embodiment is the 450 BTU/Hr (nominal) unit mentioned above and drawn to scale in FIGS. 1–5. By way of example and not by way of limitation, the parameters which contribute to the low-slope linear reluctance curve and the resulting high compressor efficiency at rating point conditions are as follows:

| | |
|---|---|
| mass of piston 42 | 0.17 lbm |
| mass of armature 40 | 0.8 lbm |
| mass of rod 41 | 0.13 lbm |
| mass of clamp 50 | 0.12 lbm |
| effective mass of springs 44 and 45 (⅓ actual mass) | 0.08 lbm |
| rate of springs 44 and 45 | 200 lb/in |
| material of rod 41 | 1060 steel |
| net cross-sectional area of armature 40 | 1.76 sq. in. |
| gross cross-sectional area of armature 40 (and 41) | 2.32 sq. in. |
| effective cross-sectional area of pole pieces 32a and 32b | 2.25 sq. in. |
| resistance of windings 32 and 33 | 2.10 ohms |
| number of turns in windings 32 and 33 | 400 |
| refrigerant suction pressure | 4.4 psig |
| refrigerant discharge pressure | 180 psig |

| | |
|---|---|
| refrigerant temperature entering compressor housing | 90°F |
| bore | 1.156 inches dia. |
| flux path area | 2.25 sq. in. |

In the working embodiment with the above exemplary parameters, the following results were measured at refrigeration industry standard rating point conditions after 10,000 hours of operation:

| | |
|---|---|
| capacity | 485 BTU/Hr |
| power input | 134 watts |
| efficiency | 3.62 BTU/watt-hour (Weston) |

In addition, the following results, which are difficult to accurately measure in a working linear compressor, were calculated from a computer analysis of the 450 BTU/Hr model, the analysis being similar to that set forth above with reference to FIG. 6:

| | |
|---|---|
| length of stroke | 0.54 in |
| position of A/C power cycle at "top dead point" of operation | 91 degrees |
| position of A/C power cycle at flush position | 207 degrees |
| current at flush position | 4.9 amps |
| flux at flush position | 213 kilomaxwells |
| position of A/C power at maximum flux | 180 degrees |
| current at maximum flux | 7 amps |
| maximum flux | 231 kilomaxwells |
| spring force at "top dead point" of operation | −70 lbf |
| spring force at "bottom dead point" of operation | +38 lbf |
| position of A/C power at opening of discharge valve | 252 degrees |

As discussed above, reluctance curve 70 at FIG. 7 indicates that this embodiment achieved the objective of having a low-sloped, linear reluctance curve. Furthermore, the above data indicates that the objective of achieving maximum flux at the flush position has been achieved within 8 percent.

Further embodiments of the present invention having greater or lesser pumping capacities may be constructed using the parameters set forth above with respect to the 450 BTU per hour embodiment of the invention by using the following equations:

$$1.\ E \sin(wt) = S \left[ \frac{10^{-8} N^2}{RS} \right] \frac{di}{dt} + S \left[ \frac{r}{S} - \frac{10^{-8} N^2}{R^2 S} \frac{dR}{dx} \frac{dx}{dt} \right] i$$

$$2.\ M \left[ \frac{d^2 x}{dt^2} \right] S + C \left[ \frac{dx}{dt} \right] S + K \times S = i^2 \left[ \frac{(-4.4) 10^{-8} N^2}{R^2 S} \frac{dR}{dx} \right] S^2 + SF$$

$$3.\ Wn = \frac{\sqrt{386 (K + Kp)(M + m)}}{mM}$$

where
$C$ = coefficient viscose friction
$E$ = Zero to peak maximum sine wave voltage
$F$ = pressure force on piston
$i$ = instantaneous current
$K$ = spring rate of return means
$Kp$ = average pneumatic spring constant
$m$ = mass of rod, armature and piston assembly along with a lumped spring contribution
$M$ = gross compressor assembly wt minus $(m)$
$N$ = number of turns in the motor windings
$r$ = motor winding resistance
$R$ = magnetic reluctance
$S$ = scaling factor
$t$ = instantaneous value for time
$x$ = displacement of the armature and piston
$Wn$ = natural mechanical frequency of the mechanical elements associated with $m$
$w$ = frequency of the electrical circuit The above equations may be readily derived from well-known art in the field of mechanical dynamics and electromagnetics as applied to a linear compressor. The basis for equation 1 is found in Roters, Herbert C., "Electromagnetic Devices," 1st ed., Wiley, New York, 1963. The basis for equation 2 will be found in Shames, Irving A., "Engineering Mechanics-Dynamics," 2nd ed., Prentice Hall, Englewood Cliffs, New Jersey, 1966. The scaling factor $S$ has been introduced into equations 1 and 2 to facilitate the development of compressors with equivalent performance over a range of capacities. The final equation 3 is from the above-mentioned Curwen article.

It has been discovered, pursuant to the present invention, that, by mathematically inserting scaling factor $S$ into the above equations, these equations may be used to approximate the dimensions and parameters of alternative embodiments of the present invention. More specifically, the parameters of a scaled embodiment may be derived from those of an operative embodiment as follows:

New capacity equals reference $\times\ S$
New bore equals reference $\times\ \sqrt{S}$
New moving mass equals reference $\times\ S$
New spring rate equals reference $\times\ S$
New flux path area equals reference $\times\ \sqrt{S}$
New coil resistance equals reference $\times\ 1/S$
New coil turns equals reference $\times\ 1/\sqrt{S}$ where $S$ is a positive real number. As stated above, application of scaling factor $S$ to the parameters of the reference embodiment will result in approximate dimensions and parameters for the alternative embodiment. Translation of these approximate dimensions and parameters into a working model may require some minor parameter adjustments in the directly scaled replica to achieve the most efficient combination of parameters, but such empirical adjustments are believed to be well within the ordinary skill in the art and do not negate the substantial savings resulting from application of these scaling principles.

The disclosed 450 BTU per hour working embodiment of the present invention was scaled from an earlier embodiment by application of a scaling factor of 1.33 to the parameters of the earlier embodiment. The resulting 450 BTU per hour embodiment had substantially the same stroke efficiency and performance characteristics as the reference embodiment and performed substantially as predicted.

From the foregoing description, it will now be apparent that there has been provided, in accordance with the invention, a moving-iron linear compressor motor that fully satisfies the objects and advantages set forth above. While the invention has been described in conjunction with specific embodiments thereof, it is evident that many alternatives, modifications, and variations will be apparent to those skilled in the art in light of the foregoing description. It will be further apparent that, while the invention has been disclosed and exemplified in connection with a refrigeration system, the invention is equally applicable to other types of refrigerant systems and that, indeed, many principles of the invention may be applied generally to gas pumps, such as air compressors or the like. Accordingly, the invention is intended to embrace all such alternatives, modifications, and variations as fall within the spirit and broad scope of the appended claims.

What is claimed is:

1. In an electromagnetic circuit of the type in which a magnetically permeable armature is disposed to axially reciprocate within an air-gap defined by a pair of spaced-apart coaxial poles on a fixed magnetic core, the improvement wherein said poles are square in cross section perpendicular to the pole axis, wherein said circuit includes electrical windings coiled around each said poles coaxially therewith to energize said circuit, and wherein said air gap comprises means providing a first space between said poles, said space having a circular cross section pependicular to the axis of reciprocation of said armature, and means providing on each said pole a pair of exposed coplanar gap surfaces, the surface plane of each pole being parallel to that of the opposing pole, said planes being displaced on opposite sides of said axis of reciprocation such that the maximum displacement between said pairs of surfaces is less than the maximum diameter of said first space, the space between respective coplanar surface pairs being devoid of core material.

2. The improvement set forth in claim 1 wherein said first space is a substantially conical space, the axis of said conical space being coaxial with said axis of reciprocation.

3. The improvement set forth in claim 2 wherein the minimum diameter of said conical space is less than the width of said poles measured along a line perpendicular to said pole and to said axis of reciprocation.

4. A moving-iron linear-motor compressor comprising, in combination,
a gas pump having a pump chamber,
a magnetic circuit stationarily connected to said pump and having spaced-apart poles defining a substantially conical air-gap, the taper of said gap converging in the direction of said chamber and the center of said gap being coaxial with said chamber,
a rod extending between said spaced-apart poles and having a pumping member carried on one end thereof and a substantially conical armature carried by the central portion thereof for movement between said poles,
bearing means disposed on the side of said air-gap remote from said pumping member and supporting the other end of said rod for axial movement and restraining lateral movement thereof,
means for magnetically activating said circuit thereby driving said armature in one direction toward said chamber, and
return means operatively connected to said armature drive said armature in a direction opposite to said one direction.

5. A moving-iron linear compressor as set forth in claim 4 wherein said pumping member abuts said armature on a plane perpendicular to said central axis of said armature and pump chamber, whereby relative movement of said armature and piston is prevented.

6. A moving-iron linear compressor as set forth in claim 4 wherein said conical armature moves in said one direction such that the large-diameter face of said armature moves into said conical air-gap beyond the large-diameter end thereof.

7. A moving-iron linear-motor compressor as set forth in claim 4 wherein
the bore of said pump chamber is substantially equal to $1.156 \sqrt{S}$ inches,
the combined mass of said compression member, armature and rod plus the effective mass of said return means is substantially equal to $1.3S$ pounds-mass,
the spring rate of said return means is substantially equal to $200S$ pounds per inch,
the cross-sectional area of each of said spaced-apart poles taken on a plane parallel to the axis of movement of said armature and perpendicular to the direction of magnetic flux through said poles is substantially equal to $2.25 \sqrt{S}$ square inches,
the electrical resistance of said magnetically activating means is substantially equal to $2.1/S$ ohms, and
the number of coil turns in said magnetically activating means is substantially equal to $400/\sqrt{S}$ turns, where S is a positive, non-zero, real number.

8. A moving-iron linear compressor as set forth in claim 4 wherein the included angle of taper of said conical air-gap and conical armature are substantially identical and wherein said angle of taper is at least 10°.

9. A moving-iron linear compressor as set forth in claim 8 wherein the included angle of taper of said armature and air-gap is between 10° and 14°.

10. A moving-iron linear compressor as set forth in claim 4 wherein said rod is formed of magnetically permeable material.

11. A moving-iron linear compressor as set forth in claim 10 wherein the gross cross-sectional area of said armature taken through the center of said armature on a plane parallel to the axis of movement thereof is greater than the cross-sectional area of said spaced-apart poles taken on a plane parallel to the axis of movement of said armature and perpendicular to the direction of flux through said poles.

12. A moving-iron linear compressor as set forth in claim 11 wherein said gross cross-sectional area excluding the area of said rod is substantially 80 percent of said cross-sectional area of said spaced-apart poles.

13. A moving-iron linear compressor as set forth in claim 4 wherein during travel of said conical armature in said one direction the small-diameter face of said armature moves out of said conical air-gap at the small-diameter end thereof.

14. A moving-iron linear-motor compressor as set forth in claim 13 wherein said small diameter face of said armature is coplanar with the minimum diameter of said air-gap substantially at the time of maximum flux through said magnetic circuit, armature and air-gap.

15. A moving-iron linear compressor as set forth in claim 4 wherein the natural frequency of said return means, rod, pumping member and armature is less than the frequency of said activating means.

16. A moving-iron linear compressor as set forth in claim 15 wherein the frequency of said activating means is 60 Hz and the mechanical frequency of said return means and said rod, pumping member and armature is substantially 38 Hz.

17. A moving-iron linear compressor as set forth in claim 4 wherein said pumping member and chamber comprise a piston and cylinder reciprocable relative to one another and having a close-clearance sliding relationship with one another whereby insertion of said rod and armature into said magnetic circuit is guided by assembly of said cylinder and piston until said armature abuts said spaced-apart poles, thereby aligning said magnetic circuit with said pump and with said rod and armature.

18. A moving-iron linear compressor as set forth in claim 17 wherein said piston is fixedly connected to said rod and the maximum diameter of said piston is less than the minimum diameter of said air-gap whereby said piston, rod and armature are insertable as one unit into said magnetic circuit until said piston extends into said pump chamber.

19. A moving-iron linear-motor compressor as set forth in claim 4 wherein the magnetic reluctance through said magnetic circuit, armature and air-gap is a substantially linear function of armature movement during the time of travel of said armature in said one direction.

20. A moving-iron linear-motor compressor as set forth in claim 19 wherein said substantially linear function is of low slope.

21. A moving-iron linear-motor compressor as set forth in claim 20 wherein said low slope is substantially 0.022 amp-turns per maxwell-inch.

22. The combination set forth in claim 4 wherein said poles defining said air-gap are coaxial and include means providing a conical hole coaxially with said chamber, and means providing opposing pairs of exposed coplanar gap surfaces, the planes of said surfaces being perpendicular to the common axis of said poles but displaced on opposite sides of said axis of reciprocation such that the maximum displacement between said pairs of surfaces is less than the maximum diameter of said conical hole, the space between said pairs of surfaces being devoid of core material.

23. The improved magnetic core set forth in claim 22 wherein said opposing pairs of exposed coplanar surfaces are parallel to each other.

24. A moving-iron linear compressor as set forth in claim 4 wherein said return means comprises paired, complementary coil springs with substantially straight end-tangs, means clamping one end of each of said springs in fixed relation to said magnetic circuit, and means operatively clamping the other end of each of said springs to said armature between said pumping member and said bearing means.

25. A moving-iron linear compressor as set forth in claim 24 wherein said coil springs comprise a pair of single turn, internested springs.

26. A moving-iron linear-motor compressor as set forth in claim 24 wherein said fixed clamping means comprises a post extending from said bearing means in a direction remote from said air-gap and chamber coaxially therewith, means slidable on said post fixedly clamping said one end of each of said springs, and means mounted on said slidable means to clamp said slidable means to said post when said armature and pumping member are in the desired rest position.

27. A moving-iron linear-motor compressor as set forth in claim 24 wherein said operatively clamping means comprises a spring clamp mounted on said rod against the large-diameter face of said armature tightly clamping the said other end of each of said springs.

28. A moving-iron linear-motor compressor as set forth in claim 24 wherein said coil springs are coiled in the same direction and wherein each of said springs enters said fixed clamping means and operatively clamping means respectively from a direction substantially 180° from the direction of entry of the other.

29. A moving-iron linear-motor compressor as set forth in claim 24 wherein said springs are so disposed that the coils thereof are diametrically contained within the peripheral boundary defined substantially by the diameter of said magnetic circuit.

\* \* \* \* \*